(12) United States Patent
Hof

(10) Patent No.: US 6,241,385 B1
(45) Date of Patent: *Jun. 5, 2001

(54) REVERSIBLE CHEMICAL THERMOMETER

(75) Inventor: Craig R. Hof, San Salvador Isl. (BS)

(73) Assignee: 3M Innovative Properties Co, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/093,299

(22) Filed: Jun. 8, 1998

Related U.S. Application Data

(60) Division of application No. 08/425,162, filed on Apr. 25, 1995, which is a continuation-in-part of application No. 08/191,254, filed on May 6, 1994.

(51) Int. Cl.[7] .............................. G01K 11/06; A61B 5/00
(52) U.S. Cl. ..................... 374/160; 374/162; 252/962; 252/408.1; 600/549
(58) Field of Search .................. 374/160, 162; 252/408.1, 962; 116/207, 217; 600/549

(56) References Cited

U.S. PATENT DOCUMENTS

| | | | |
|---|---|---|---|
| 2,261,473 | 11/1941 | Jennings | 252/379 |
| 3,572,400 | 3/1971 | Casner et al. | 141/1 |
| 3,810,779 | 5/1974 | Pickett et al. | 117/37 |
| 3,859,856 | 1/1975 | Keele et al. | 73/356 |
| 3,956,153 | 5/1976 | Chadha | 252/67 |
| 3,965,742 | 6/1976 | Parker | 73/356 |
| 3,970,119 | 7/1976 | Doane | 141/1 R |
| 3,980,581 | 9/1976 | Godsey et al. | 252/408 |
| 3,998,098 | 12/1976 | Chilton | 73/356 |
| 4,064,872 | 12/1977 | Caplan | 128/2 H |
| 4,150,572 | 4/1979 | Lindquist | 73/356 |
| 4,232,552 | 11/1980 | Hof et al. | 73/356 |
| 4,233,801 | 11/1980 | Watt | 53/453 |
| 4,299,727 | 11/1981 | Hof et al. | 252/408 |
| 4,339,207 | 7/1982 | Hof et al. | 374/160 |
| 4,344,909 | 8/1982 | De Blauwe | 264/230 |
| 4,345,470 | 8/1982 | Hof et al. | 374/106 |
| 4,362,645 | 12/1982 | Hof et al. | 252/408 |
| 4,397,570 | 8/1983 | Hof et al. | 374/162 |
| 4,450,023 | 5/1984 | De Blauwe | 156/64 |
| 4,451,383 | 5/1984 | Arrhenius | 252/70 |
| 5,094,545 | 3/1992 | Larsson et al. | 374/160 |
| 5,111,768 | * 5/1992 | Larsson et al. | 252/408.1 |

FOREIGN PATENT DOCUMENTS

| | | | |
|---|---|---|---|
| 84 38 254 U | 4/1985 | (DE) | G01N/1/28 |
| 241247 | 10/1987 | (EP) . | |
| 0 684 463 A1 | 11/1995 | (EP) | G01K/11/00 |
| 0023380 | 2/1977 | (JP) | G11K/11/06 |
| 1-112123 | 4/1989 | (JP) . | |

* cited by examiner

Primary Examiner—G. Bradley Bennett
Assistant Examiner—Jeanne-Marguerite Goodwin
(74) Attorney, Agent, or Firm—Jeffrey J. Hohenshell

(57) ABSTRACT

A composition of matter suitable for use in a reversible thermometer is disclosed which comprises a thermally responsive material capable of being supercooled at least for several minutes, and subject to a change in state from a solid to a liquid substantially at a predetermined temperature; means for visually observing the change in state; and a matrix forming material comprising an amorphous organic compound, the matrix forming material being insoluble in the thermally responsive material; whereby the thermally responsive material is dispersed within the matrix forming material, the composition of matter being reversibly responsive to changes in temperature, and remaining in the liquid state for a time sufficient to permit a user of the composition to observe the change in state. The preferred matrix forming material is polyisobutylene, and the preferred thermally responsive material is a solid solution of ortho-chloronitrobenzene and ortho-bromonitrobenzene. A process is disclosed for preparing the composition of matter.

18 Claims, 2 Drawing Sheets

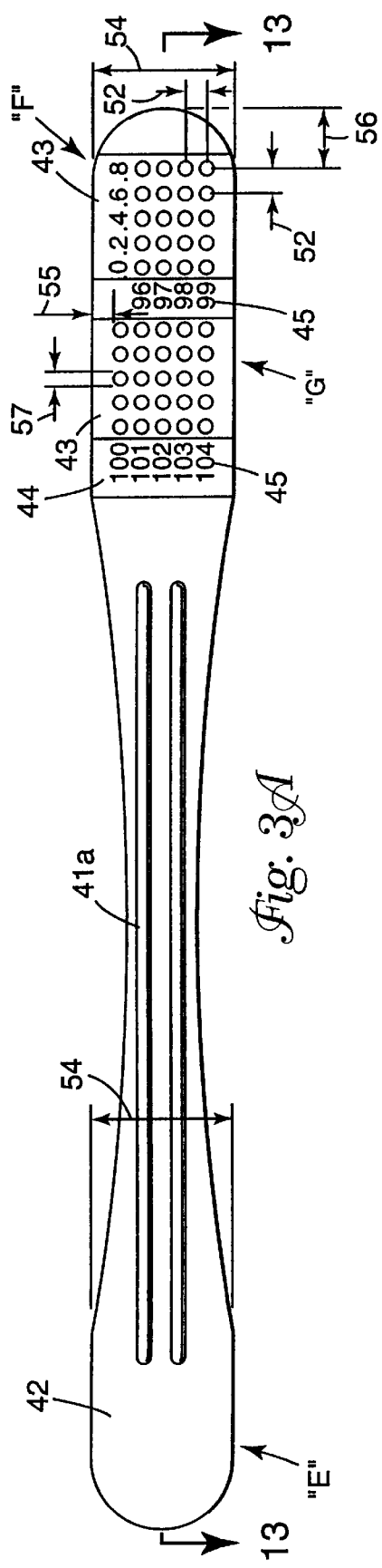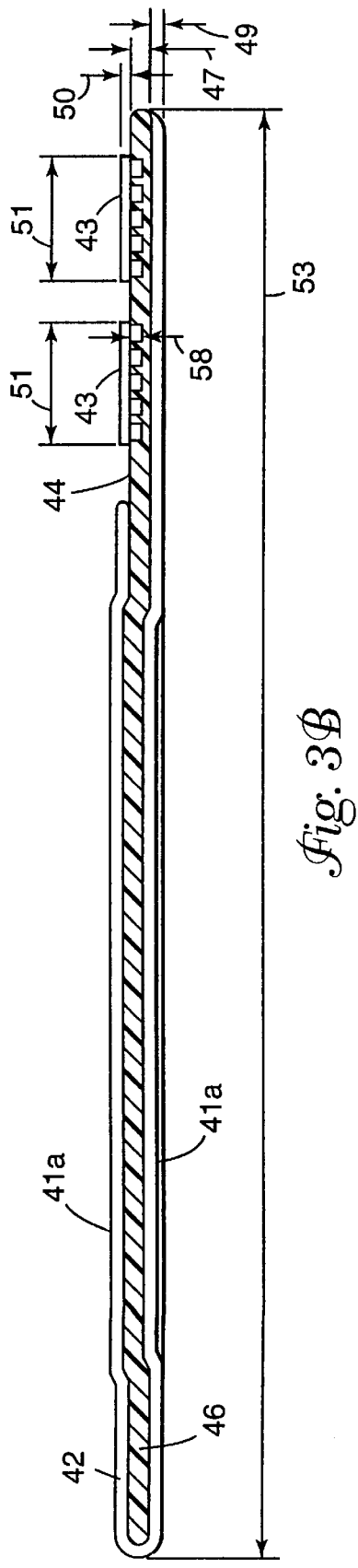
Fig. 3A
Fig. 3B

REVERSIBLE CHEMICAL THERMOMETER

CROSS-REFERENCE TO RELATED APPLICATIONS

This application is a division of Ser No. 08/425,162 filed Apr. 25, 1995, which is a continuation in part of U.S. patent application Ser. No. 08/191,254 filed May 6, 1994.

FIELD OF THE INVENTION

This invention relates to a chemical thermometer. In particular it relates to a chemical type clinical thermometer which holds its signal for a time sufficient to be read, but reverses to its original condition thereafter.

BACKGROUND OF THE INVENTION

U.S. Pat. No. 3,946,612, incorporated herein by reference, discloses a clinical thermometer comprising a plurality of cavities filled with solid solutions of two thermally responsive materials in each pocket. The melting point of the contents of each pocket varies as a result of the ratio of the two compounds in each pocket. The compositions are compounded to cover the clinical temperature range in 0.2° F. increments. The preferred thermally responsive material comprises a solid solution of ortho-chloronitrobenzene and ortho-bromonitrobenzene (OCNB and OBNB respectively).

The composition of U.S. Pat. No. 3,946,612, is subject to a supercooling phenomenon. Upon melting the composition remains in the liquid state long after the composition has been brought to a temperature below its melting point. For the thermometers of the type contemplated by the prior art his presented problems, and means were devised to cause the compositions to solidify rapidly upon being cooled below their melting point.

U.S. Pat. No. 3,980,581 disclosed compositions useful as nucleating agents in the OCNB/OBNB solid solutions of the prior art. These nucleating agents are salts of metals and include sodium borate, cryolite, sodium acetate and cobalt chloride.

The nucleating agents of the '581 patent though effective were subject to a "poisoning" effect. As the thermally responsive materials were subjected to melting and resolidification cycles the nucleating agent pores eventual became filled with the thermally responsive material. As a result, the nucleating agent became ineffective. This "poisoning" problem was solved by the invention disclosed in U.S. Pat. No. 3,956,153, incorporated herein by reference.

The '153 patent discloses a regenerative nucleating agent comprising a compound which is sparingly soluble in the thermally responsive material. Although a minor amount of material dissolves into the thermally responsive material when it melts, sufficient undissolved material remains to act as a nucleating agent. Because the nucleating agent is sparingly soluble, its surface is continually regenerated, and no poisoning effect is observed.

U.S. Pat. No. 4,397,570 discloses a disposable thermometer similar to that of Hof et al. 4,232,552, incorporated herein by reference, which utilizes a pressure sensitive adhesive containing a nucleating agent to make a thermometer which is reversible and maintains its signal for about 3–5 minutes. The adhesive utilized is the polyisobutylene adhesives of U.S. Pat. No. 4,189,942, incorporated herein by reference. The nucleating agents are generally mineral type compositions such as talc, gibbsite, calcium aluminate, etc.

U.S. Pat. No. 4,248,089 discloses a reversible thermometer wherein the temperature sensitive material comprises a combination of high molecular weight fatty acids. A nucleating agent which both allows the thermometer to be reversible and at the same time hold its signal for a reasonable period of time to be read is included. Suitable nucleating agents include dyes such as Auramine, Acridine Yellow, Red, and Orange; Rhodamine and Sudan Black.

U.S. Pat. No. 4,299,727 to Hof discloses a reversible thermometer utilizing a heat sensitive composition, preferably that of Hof et al. U.S. Pat. No. 4,232,552; a matrix forming amorphous material and a film forming material which is more crystalline than the matrix forming compound. The heat sensitive composition can be a ortho-chloronitrobenzene (OCNB), ortho-bromonitrobenzene (OBNB), 1-thymol, 2-naphthol and naphthaline. The matrix forming amorphous material can comprise microcrystalline waxes and polyisobutylene. Suitable film forming materials include high melting aliphatic alcohols. Optionally, a solubilizing material such as docosanol can be included. The preferred heat sensitive composition is a combination of OCNB and OBNB.

U.S. Pat. No. 4,150,572 discloses a reversible thermometer wherein the signal is maintained for a reasonable period by the addition of a polymer to a thermally sensitive material. The preferred thermally sensitive material is a combination of OCNB and OBNB. The polymer must be soluble in the thermally sensitive material at a level of about 10 to 75 wt. % based on the thermally sensitive material at the melting point of the thermally sensitive material. Suitable polymers include the thermoplastic polymers such as polystyrene, polycrylates and polyvinyl butyral.

Presently, the only commercially available chemical type thermometer utilizing the solid solutions of the '612 patent is a device disclosed and claimed in U.S. Pat. No. 4,232,552, incorporated herein by reference. While the patent discloses compositions utilizing the prior art nucleating agents the device being marketed contains no nucleating agent. That thermometer relies on the supercooling effect to give a signal which is retained for a time sufficient to be read. Since the thermometer is sold as a single use devise, reversal of the signal is not required. Use of the prior art nucleating agents, however, results in a reversal which is too rapid for use where the device is to be read after it is removed from the heat source, the mouth for example. In order for the device of the '552 patent to be reusable it must revert to its original solid state in a reasonable amount of time while at the same time hold a signal to be read for a time sufficient to permit the user to read the temperature shown.

SUMMARY OF THE INVENTION

It has surprisingly been found that a reversible thermometer can be prepared by forming a matrix of an amorphous organic compound in which a thermally sensitive material is insoluble at the temperature to be indicated by the thermally sensitive material. The preferred thermally sensitive material is a solid solution of o-chloronitrobenzene (OCNB) and o-bromonitrobenzene (OBNB). the matrix forming amorphous material is preferably a polymer, e.g., polyisobutylene.

BRIEF DESCRIPTION OF THE DRAWINGS

FIG. 3A and 3B are, respectively, a plan view of a prior art flat temperature indicating device comprising a heat conducting carrier means with a grid of cavities thereon; and an elevation view taken along line 13—13 in FIG. 3A revealing the heat conducting carrier means within transparent cover sheet means and a bottom plate means;

DETAILED DESCRIPTION OF THE INVENTION

Figure 1:
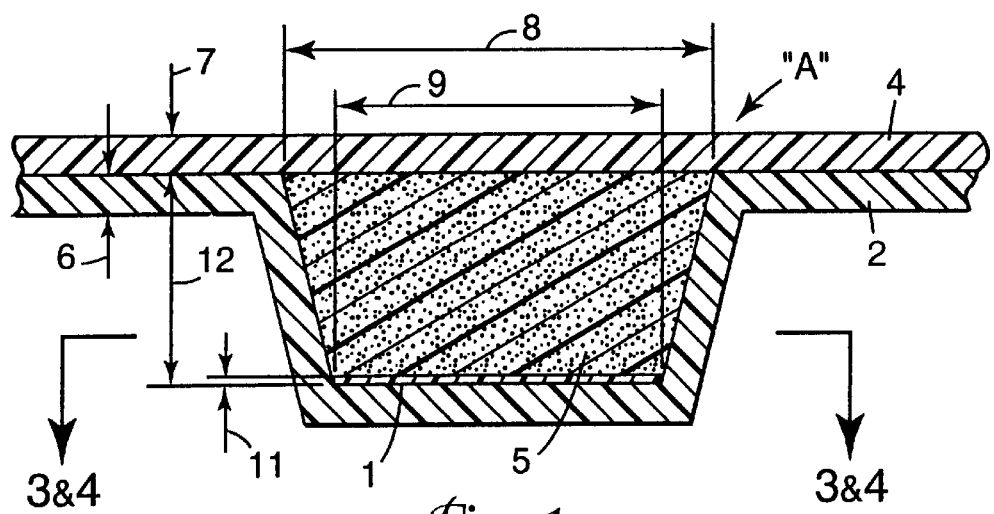
FIG. 1 is a partial elevation view of a flat or graduated curved prior art heat-conducting carrier having a cavity defined therein, which cavity forms an enclosure for a temperature sensitive "classical" composition of matter therein when such cavity is covered by a transparent cover sheet means in sealing engagement with carrier means overlaying the heat conducting carrier means and above the cavity.

This invention relates to chemical type thermometers. In particular it relates to reversible clinical thermometers of the chemical type. Chemical thermometers are those thermometers which use a normally solid chemical (organic) compound as the temperature sensitive material instead of mercury or other liquid materials.

Specifically this invention relates to method and composition for preparing a reversible thermometer of the chemical type. Generally, clinical chemical thermometers require that the thermally sensitive materials be subject to some degree of supercooling so that the user will have sufficient time to read the thermometer after it is removed from the patient. Super-cooling refers to the phenomenon which maintains a normally solid material in the liquid state after it has been melted and its temperature is reduced below its melting point. While any chemical thermometer may be used in the practice of this invention so long as the criteria described herein are met, the preferred chemical type thermometer is that described by Hof et al. in their U.S. Pat. No. 4,232,552. In order that the advantages of the instant invention can be more readily appreciated by those skilled in the art having access to this disclosure, the disclosure of U.S. Pat. No. 4,232,552 will be repeated herein in detail.

Throughout the Detailed Description below, the terms "novel thermally-responsive substance", "novel thermally-responsive material", "novel temperature-indicting compositions of matter", "novel temperature-sensitive solid solutions", "novel temperature-indicating solid solutions", and "novel solid solutions", or variations thereof, are used interchangeably to denote the same novel materials of the Hof '552 invention. Otherwise, the term "compositions of matter" or "classical compositions of matter" are used interchangeably to denote compounds which change only from being opaque to transparent with a corresponding change from the solid to liquid state, or vice versa.

1.Compositions of Matter

The discovery disclosed in the Hof et al. '552 patent is that certain organic compounds (to be described hereinafter) form solid solutions which undergo a change in state from solid to liquid at precise and predetermined temperatures with a corresponding change in color visible to the naked eye, and likewise, form liquid solutions which undergo a change in state from liquid to solid at a predetermined temperatures with a corresponding change in color visible to the naked eye. The term "solid solutions" is well known and usually refers to a homogeneous solution of one solid in another. The solid solutions contemplated in the present invention are composed of two or more, preferably three or four, different organic compounds with varying proportions of at least two compounds which form a solvent for the solution. Each solid solution undergoes a rapid change of state at a predetermined temperature or substantially thereabouts. By a "change in color visible to the naked eye" of a source we mean a change in the wavelength of luminous flux of light (from the source distributing or reflecting such energy in the region of the Electromagnetic Spectrum from about 3900 angstrom units to about 7600 Angstrom units before or after the change, or preferably both) visible to a person of normal vision and eyesight wherein the intensity of the luminous flux surrounding the source is more than or about 5 lumens per square food (ft-c). in most instances, this change in the wavelength of luminous flux to the eye will be at least about 175 Angstroms, and preferably at least about 500 Angstroms.

Preferably, when a small but effective amount (generally a weight fraction from about 0.005 to 0.2 weight percent, and generally about 0.03 weight percent of the entire composition, but the optimum may be more or less upon experimentation, depending on the below described Group I-III compounds, selected and the solvent selected, up until both phases appear dark, appear the same color, or the melting point becomes too broad for the for the use desired—some latitude for experimentation is present her) of one or more of Group III compounds comprising: pinacyanol iodide, 1,1'-diethyl-2,2'-cyanine iodide, quinaldine red, pinacyanol chloride, thionin, methylene bluc, cresol red, chlorophenol red, neutral red iodide, neutral red chloride, crystal violet, acridin orange, Orasol Orange RLX™, Orasol Navy Blue™, Irgalith Red PR™, Fat Red BS™, Xylene Cyanol FF™, Rhodamine B, Rhodamine 6G™, Iragalith Magenta TCB™, Iragalith Pink TYNC™, Toluidin Blue O™, Savinyl Green B. Savinyl Blue RS™, purpurin, 3.3"-diethyl-thiadicarbocyanine iodide, cryptocyanine, Dicyanine A™, Merocyanine 540™, 4-(p-ethoxyphenylazo)-n-phenylene diamine monohydrochloride, Yellow Orange S™, Chrysoldin G™, fuchsin, aurintricarboxylic acid (ammonium salt), Victoria Blue R™, Pyronin G™, gallein, Erythrosin Yellowish Blend™, chlorophenol blue, bromophenol blue, bromocresol purple, Coriphospine O™, acriflavin, acridine orange, rhoduline violet, Alizarin cyanin 2 R™, Alizarin Red S™, alcannin, Aurantia™, Direct Green G™, Fast Red Salt 3GL™, Fast Blue Salt BB™, Fast Garnet Salt GBC™, Carta Yellow G 180 o/o Murexido, Savinly Blue GLS™, Irgalith Blue GLSM™, phthalocyanine, Di Aningreen B™, Alizarin Blue S, Celiton Blue Extra™, neocyanine, Janus Green™, dimethyl yellow, Fast Yellow, Methyl red sodium salt, Alizarin yellow R™, Eriochrome black T™, Chromotrope 2R™, Ponceau 6R™, Brilliant Ponceau G/R/2R™, chromolan yellow, Sudan red B™, Bismarck brown G™, Fat Black™, Resorcin Brown™, Benzofast pink 2 BL™, Oil Red EGN™, Euroglaucine, Fuchsin NB™, parafuchsin. Patent Blue ™, Irgalith Blue TNC™, Phloxin B™, fluorescein sodium salt, Rhodamine B base™, Eosinscarlet. Eosin Yellowish™, Erythrosin extrabluish, 4,5-dibromofluorescein, ethyleosin, Phloxine™, Cyanosin B™, chlorocresol green, pinacyanol bromide, 2-(p-dimethylaminostyryl)-1-ethyl pyridinium iodide, ethyl pyridinium iodide, ethyl red, nigrosine, savinyl blue B™, Orasol Blue BLN™, Safranin O™, Solophenyl Brilliant Blue BL™, Nile blue A™, gallocyanine, gallamine blue celestine blue, methylene green, Azure A/B/C™, Blue VIF™, Organol™, Alizarin, Nitrofast Green GSB™, quinalizarine, Oil blue N™, Solvay purple, Ciba Blue™, Indigo synthetic™, Chromophtal Bordeaux RS™, Acid Alizarin Red B™, 5-Aminofluorescein. Rose Bengal™, Martlus Yellow™, Chicago Blue 6B™, Alcian blue 8GX™, cresyl violet, 4,4'-Bis(dimethylamino)benzylhdrol, Zinc Pthalocyanine, Sudan III™, Pyronin Y™, Toluylene Blue™, Cresyl Violet perchlorate, Mendola's Blue™, 3,3'-diethylthiadicarbocyanine iodide, Phosphine Dye™, Nitron™, cresyl violet aceate, Ceres Orange R™, 4-phenylazo-1-naphtyl-amine, 4-(4-Dimethylamino-1-naphtylazo-3-methoxybenzene sulfonic acid, Bindschedler's Green™, and p-(p-dimethylaminophenylazo) benzoic acid, or one of the other organic moieties to be described (one or more Group I compounds with one or more Group II compounds) is combined with a suitable solvent, for example, a pure mixture of ortho-chloronitrobenzene (OCNB) and ortho-bromonitrobenzene (OBNB) for use in clinical applications. The temperature of the change of state of a number of solid solutions with a corresponding change in color may be accomplished at approximately $1/10°$ C. or $2/10°$ F. intervals, i.e., a change of state of one temperature-sensitive composition of matter at a temperature $1/10°$ C. or $1/5°$ F. different from the temperature of chance in state of another novel composition of matter in an adjacent region containing another proportion of the same organic moieties in ortho-chloronitrobenzene and ortho-bromonitrobenzene. Thus, for example, in human clinical applications where temperature measurements in the range of 96° F. to 105° F. (or from 35.5° C. to 40.5° C.) are usually desired, 45 to 50 different solid solutions differing in their percentage compositions but otherwise made from the same two components) will provide all of the necesary temperature gradations at increments of $2/10°$ F., i.e., 96.0°, 96.2°, 96.4°, etc., up and including 104.8° F., or in the alternative 35.5°, 35.6°, 35.7°, up and including 40.4° C. The solution of ortho-chloronitrobenzene and ortho-bromonitrobenzene, when the ortho-bromonitrobenzene varies from 56.2 weight percent to 96.0 weight percent, provides an excellent starting mixture for determination of temperatures in the human clinical temperature range. Usually the addition of the Group I-III organic moieties (hereinafter sometimes "organic moieties") consisting of a small but effective percentage of one or more of the aforesaid Group III compounds, or a combination of one or more Group I compounds with one or more Group II compounds affects the temperature curve of the solid solution by only a small increment which is substantially constant along the entire curve. Regardless of the solvent system selected for a given predetermined temperature range, it is necessary that the organic moieties selected for the color change constitute a small but effective amount of moieties, e.g., at least the amount sufficient to provoke a color change visible to the naked eye, and preferably up to a saturated solution of Group I-III organic moieties, and most preferably about 0.005 to about 0.2 weight percent of an inert, preferably aromatic solvent constituents, constituting the remaining balance of the mixture. The Group I-Group III moieties may in some instance exceed 0.2 weight percent as long as the melting point remains sharp and both phases are not so dark as to eliminate a color change visible to the naked eye. If too small an amount of organic moieties is employed, the colors and the color change are too faint under weak light; if too large an amount is employed, the colors are too dark and the color change is harder to visualize and there is a possibility that the sharpness of the melting point will be affected. It is also noted that the organic moieties and suitable solvent to be described should be substantially free of impurities, generally, such impurities should be kept less than three tenths of one percent of the entire composition. Supersaturated solutions are not preferred for reasons to be enumerated below.

The dye systems (organic moieties) of the '552 patent are useful in the practice of this invention, and are incorporated into the solid solutions at a preferred concentration about 0.05 wt. % to about 0.15 wt. % based on the weight of solid solution plus organic moiety; more preferably at about 0.035 to about 0.1 wt. %.

It must be emphasized from the outset that once a proposed solvent system has been selected (consisting of one or more compounds) for the temperature(s) to be determined, the compound(s) of the system must be tested for the Group I-III moieties for stability (i.e., inertness) and solubility of the Group I-III moieties in the compound(s) of the solvent. This must be done by routine testing, within the skill of those in the art. Only after the solvent system compound(s) are shown to dissolve the Group I-III moieties and be inert towards then, can such a solvent system be suitable for our invention.

Those skilled in the art will appreciate that organic compounds, unlike crystalline materials, exhibit a melting point range rather than a sharp melting point. For example the OCNB and OBNB exhibit a melting point range of about 2.0° F. Temperature readings of within about 0.2° F. or 0.1° C. are achieved by selecting completion of melt temperature differentiated from one another by the incremental reading desired.

While sometimes under fortuitous circumstances the solvent system may consist of only one compound, in most instances (as those skilled in the art will appreciate) the temperature to be determined will not be readily obtainable without mixing two or more organic compounds for the solvent system. Hence for a temperature-indicating device, two or more related organic compound constituents in the solvent are especially helpful for measuring forty or more temperatures located at regular increments.

It is apparent from the foregoing description that the selection of one or more inert solvents towards the organic moieties for use in the composition of matter requires judicious and careful scrutiny, since not all organic compounds are useful for this purpose and many may fall outside desired temperature range. A suitable solvent may be any solvent which is inert towards the organic moieties and in which the organic moieties are soluble while the solvent is in the liquid phase. In some instances, simple alcohols and other organic substances may be suitable rather than aromatic compounds. The organic compounds which are particularly adapted for the formations of solid solutions which can serve a temperature-indicating composition in accordance with the present invention are generally those which are weakly polar (e.g. compounds which are immiscible in water and have a dielectric constant less than about 35) or moderately polar aromatic organic compounds, as well as the requirements of organic moiety solubility and inertness towards the organic moieties. Thus, it has been discovered that weakly polar or moderately polar aromatic organic compounds, which have analogous chemical structures (e.g., analogs, homologs and optical isomers), have substantially the same molecular volume or have similar crystalline structures (e.g., isomorphous) and which form the solid solutions useful for solvent system constituents in preparing a grid of composition of matter to be used in predetermined temperature range for the determination of a temperature falling within said range. In addition, it is preferable that the solvent solutions have a linear or a substantially linear temperature composition liquidous curve, particularly over the desired temperature range such as, for example, over the human clinical temperature range.

Exemplary weakly polar or nonpolar aromatic solvents are ortho-chloronitrobenzene, ortho-bromonitrobenzene, naphthalene, 2-ethoxybenzamide, 1-thymol, 2-naphthol, ortho-iodonitrobenzene, meta-iodonitrobenzene, para-iodonitrobenzene, para-dibromonitrobenzene and para-toluic acid. It must be emphasized, of course, that a suitable solvent useful for one selection of organic moieties may not be useful for another, and that an operable solvent at one temperature range may not work at a different range. It is recommended that for a given temperature to be measured, one may start his investigation for the appropriate temperature(s) to be determined a suitable solvent system selected from compounds from the following:

(1) moderately polar or weakly polar aromatic compounds, i.e., compounds having a dielectric constant of less than about 35;

(2) water; or (3) aromatic and aliphatic compounds other than (1)–(2) which are germane to the temperatures to be determined, and which are "inert" to the Group I-III dyes.

The constituents of the compositions of matter comprise:

(1) a solvent (I) consisting of a single substance or a mixture of substances and adapted to change from a solid state at substantially a predetermined temperature to a liquid state and (2) an indicator system (II) consisting of one or more substances different from (I), characterized in that (a) (II) is soluble in (I) when the latter is in the liquid phase, and (b) (II) changes color visible to the naked eye when (I) passes from the solid to the liquid phase or from the liquid to the solid phase.

It is well within the range of knowledge of those skilled in the art to find for a given temperature range to be measured, and for color change desired (choosing from the various Group I-III compounds) a suitable solvent, i.e., one which is inert toward the Group I-III compounds and for which the latter a soluble in the liquid phase to said solvent.

The solid solutions made from ortho-chloronitrobenzene and ortho-bromonitrobenzene have been found to be most preferable for use in temperature measurements in the clinical range within the aforesaid accuracy. Of course, as it will be readily understood by those skilled in the art, any two or more aromatic solvents as defined above in which the organic moieties to be described below are soluble, stable and inert, may be employed for thermometers if adaptable to the temperature range to be tested, and if capable together of forming a homogeneous solid solution.

Preferably the composition of matter consists essentially of:

(A) a suitable solvent adapted to change from a solid state at a predetermined temperature to a liquid state, and (B) an effective amount of one or more suitable organic moieties soluble in said solvent in the liquid state and adapted to change the color of the composition visible to the naked eye upon the change of state of the solvent at substantially the predetermined temperature and selected from one or more of the group consisting of (1) a group III body of single compounds consisting of the cyanine class of dyes, suitable dyes from the following classes: monoazo, diazo, triarylmethane, xanthene, sulphonephthalein, acridul, quinoline, azine, oxazine, thiazine, anthraquinone, indigold, and the following individual compounds: Aurantia™, Orasol orange RLN™, Diamin green B™, Direct green G™, Fast red salt 3 GL™, Fast blue salt BB™, Fast Garnet salt GBC™, Carta Yellow G 180 o/o™, Murexide, Savinyl blue GLS, Irgalith blue GLSMv, Phthalocyanine and Alcannin.

(2) mixtures of:
(a) one or more organic acids compounds, having a pK of less than about four, and (3) mixtures of
(a) one or more organic acids having a pK of less than about 2 and
(b) one or more acid dyes or acid indicators (4) mixtures of
(a) one or more organic acid compounds having a pK of less than about 4 and
(b) one or more members of the group I body of compounds.

(5) mixtures of
(a) one or more basic dyes or basic indicators and
(b) one or more members of the group I body of compounds.

(6) mixtures of
(a) one or more dyes having a molecular structure containing a lactone group, and
(b) one or more acids having a pK of about 8 to about 12.

The compounds mentioned in group III are classified according to the Colour Index, 3rd Edition (1971), published by the Society of Dyers and Colourists, Great Britain and Conn's Biological Stains (9th Ed 1977).

Suitable monoazo dyes are: 4-(p-Ethoxyphenylazo)-m-phenylene-diamine monohydrochloride, Orasol Navy Blue ™, Organol Orange, Janus Green™, Iragalith red P4R, Dimethyl yellow, Fast Yellow, Methyl red sodium salt, Alizarin Yellow R-, Eriochrome Black T, Chromotrope 2R, Ponceau 6R, yellow Orange S™, Brilliant Ponceau 5R™, Chrysolidin G™, Eriochrome black A, Benzyl orange, Brilliant ponceau G/R/2R™ and chromolan yellow.

Suitable disazo dyes are: Fat red BS™, Sudan Red B™, Bismarck Brown G™, Fat Black™, Resorcin Brown™, Benzofast Pink 2 BL™ and Oil Red EGN™.

Suitable triarylmethane dyes are: Methyl violet, Xylene cyanol FE™, Erioglaucine™, Fuchsin NB™, Fuchsin, Parafuchsin, Aurintricarboxylic acid Ammonium salt, Patent Blue, Victoria blue R™, Crystal violet and Irgalith Blue TNC™.

Suitable xanthene dyes are: Phloxin B. Fluorescein sodium salt, Rhodamine B, Rhodamine B Base™, Rhodamine 6G™, Pyronin G, Irgalith Magenta TCB™, Irgalith Pink TYNC™, Eosin Scarlet™, Eosin Yellowish, Erythrosin extra bluish™, 4'5'-Dibromofluorescein, Ethyl eosin, Gallein, Phloxine™, Erythrosin yellowish Blend™ and Cyanosin B™.

The suitable sulphonephthaleins are cresol red, chorophenol red, chlorophenol blue, bromophenol blue, bromocresol purple and chlorocresol green.

The suitable acridine dyes are: Corisphosphine O™, Acriflavine and acridine orange.

The most suitable quinoline dyes are: pinacyanol chloride, pinacyanol bromide, pinacyanol iodide, quinaldine red, cryptocyanine, 1,1'-Diethyl-2,2'-cyanine iodide, 2-(p-Dimethylaminostyryl)-1-ethyl-pyridinium iodide, 3,3'-Diethylthiadicarbocyanine iodide, ethyl red, Dicyanine A. Merocyanine 540 ™ and Neocyanine™.

The suitable azine dyes are: Neutral red chloride, Neutral red iodide, Nigrosine™, Savinyl blue b™, Orasol blue BLN™, Safranin O™, Azocarmin G™, Phenosafranine™, Azocarmine BX™ and Rhoduline violet.

The suitable oxazine dyes are: solophenyl Brilliant Blue BL™, Nile blue A™, Gallocyanine™, Gallamine Blue™ and Celestine blue.

The suitable dyes are: Methylene blue, Thinonin Toluidine Blue O, Methylene Green and Azure A/B/C™.

The suitable anthraquinone dyes are: Savinyl Green B™, Savinyl Blue RS, D+C Green 6™, Blue VIF Organol™, Alizarin, Alizarin Cyanine 2R™, Celliton Blue Extra™, Alizarin Blue S™, Nitro Fast Green GSB, Alizarin red S. Chinalizarin, Oil Blue N, Solvay Purple™ and Purpurin™.

The suitable indigold dyes are: Ciba Blue™, Indigo Synthetic™, Chromophtal Bordeaux RS™ and Thioindigo red.

Instead of one or more group I compounds, to be used in the composition of matter, mixtures can be employed.

The group of organic acidic compounds with a pK less than about four generally consists of organic acids and/or the halogenated sulfonphthaleins, which are soluble in the selected solvent, when the latter is in the liquid state. Examples of these acids include oxalic acid, maleic acid, dichloroacetic acid, trichloroacetic acid, 2-naphthalene-sulphonic acid, chloroanilic acid, bromophenol blue, bromothymol blue, chlorophenol red, bromochlorophenol blue, bromocresol green, 3,4,5,6-tetrabromophenol-sulfonphthalein, bromophenol red, chlorocresol green, chlorophenol blue, bromocresol purple and 2,4-dimitro-benzenesulphonic acid.

The group of basic dyes or basic indicators are generally the aminotriphenyl methanes, also known as the triaryl methanes, or their soluble salts, 8-hydroxyquinoline and the quinoline dyes, preferably the cyanines. Examples are: basic fuchsin, pinacyanol iodide, pinacyanol chloride, pinacyanol bromide, 2-p-(dimethylaminostyryl)-1-ethyl-pyridinium iodide, crystal violet, cryptocyanine, dicyanine A, 3,3'-diethylthiacarbocyanine iodide, 1,1'-diethyl-2,2'-cyanine iodide, ethyl red, quinaldine red, ethyl violet, brilliant green, pararosaniline, pararosaniline acetate, 8-hydroxy-quinoline, 1-ethylpyridinium iodide and 5-(p-dimethylaminobenzilidine) rhodanine. Preferably the weight of the acid compounds is about three or more times the weight of the basic compounds.

The above-mentioned pK values refer to the pK values as measured in water. Generally it is preferred that the pK of the acidic compound is lower than the corresponding pK value of the basic compound. Preferably the acid compounds have a pK value less than about four and the basic compounds have a pK value less than about 5.

It should be noted that when the basic compound consists solely of one or more aminotriphenylmethanes or their soluble salts, the acid compound must be selected from the group consisting of tetrahalogenated sulphonphthaleins and the other organic acids having a pK of less than about 2.

Preferred combinations of acidic compounds having a pK less than about 4 and basic dyes or basic indicators are bromophenol blue/basic fuchsin, chlorophenol blue/ethyl red and trichloracetic acid/3,3'-diethylthladicarbocyanine iodide.

Mixtures of one or more organic acids having a pK less than about 2 and one or more acid dyes or acid indicators, used in the composition of matter, changes color when the solvent passes from the solid into the liquid phase or reversed. In this combination the acid dyes used are preferably halogenated sulfonphthaleins.

Mixtures of one or more organic dyes, having a molecular structure containing a lactone group and one or more acids having a PK of about 8 to about 12, used in a solvent also change color when the solvent passes from the solid phase onto the liquid phase or reversed. In that combination the preferred compounds are crystal violet lactone and one or more of acids such as phenol, bisphenol a, pyrocathechol or 3 nitrophenol.

The compositions of matter most preferably comprise (a) a suitable inert solvent as described above adapted to change from a solid state to a liquid state at substantially the predetermined temperature and (b) one or more organic moieties soluble in said solvent and adapted to change color upon the change in state of the solvent at substantially the predetermined temperature when so dissolved, and selected from:

(1) one or more Group III compounds consisting of pinacyanol iodide, quinalidine red, 1,1'-diethyl-2,2'cyanine iodide, pinacyanol chloride, thionin, methylene blue, cresol red, chlorophenol red, neutral red iodide, neutral red chloride, crystal violet, acridin orange, toluidin blue O, Orasol Orange RLN™, Orasol Navy Blue™, Irgalith Red PR™, Fat Red BS™, methyl violet, Xylene Cyanol FF™, Rhodamine B™, Rhodanine 6G™, Irgalith Magenta TCB™, Irgalith Pink TYNC™, Toluidin Blue O™, Savinyl Green B™, Savinyl Blue R5™, purpurin, 3,3'-diethylthiadicarbocyanine iodide, cryptocyanine, Dicyanine A. merocyanine 540, 4-(p-ethoxyphenlazo)-m-phenylene diamine monohydrochloride, Yellow Orange 5™, Chrysidan G™, fuchsin, Aurintricarboxylic acid (ammonium salt), Victoria Blue R™, Pyronin G™, gallein phloxine, Erythrosin Yellow Blend™, chlorophenol blue, bromophenol blue, bromocresol purple, Coriphospine O™, acriflavine, acridine orange, rhoduline violet, Alizarin cyanin 2R™, Alizarin Red S™, alcannin, Aurantia, Direct Green G™, Fast Red Salt 3GL™, Fast Blue Salt BB™, Fast Garnet Salt GBC™, Carta Yellow G 180 o/o™, nurexide, Savinyl Blue GLS™, Irgalith Blue GLSM™, phthalocyanine, Di Amin-green B™, Alizarian Blue S™, Celliton Blue Extra, neocyanine, Janus Green™, dimethyl yellow, Fast Yellow™, methyl red sodium salt, Alizarin yellow R™, Eriochrome black T™, Chromotrope 2R™, Ponceau 6R™, Brilliant Ponceau G/R/2R™, Chromolan yellow, Sudan Red B™, Bismarck Brown G™, Fat Black™, Resorcin brown™, Benzofast pink 2BL™, Oil Red EGN™, Euroglaucine, Fuchsin NB™, parafuchsin, Patent Blue™, Irgalith Blue TNC™, Phloxin B™, fluorescein sodium salt, Rhodamine B base™, Eosinscarlet, Eosin Yellowish™, Erythrosin extra bluish, 4'5-dibromo fluorescein, ethyleosin, Phloxine™, Cyanovin B™, chlorocresol green, pinacyanol bromide, 2-p-dimethylaminostyryl)-1-1-ethyl pyridinium iodide, ethyl red, neutral red, iodide, nigrosine, Savinyl Slue b™, Orasol Blue BLN™, Safranin O™, Azocarnum G™, Phenosafranine, Azocarmine BX™, Solophenyl Brilliant Blue BL™, Nile Blue A™, gallocyanine, Gallamine blue, celestine blue, methylene green, Azure A/B/C™, Blue VIF Organol™, Alizarin, Nitrofast Green GSB™, quinalizarine, Oil Blue N™, Solvay Purple™, Ciba Blue™, Indigo Synthetic™, Chromophtal Bordeaux RS™, Thiorifolex™, Acid Alizarin Red B™, 5-aminoflourescein, Rose Bengal™, Martius Yellow™, Chicago Blue 6B™, Alcian Blue 8GX™, cresyl violet, 4,4'Bis(dimethylamino) benzylhydrol, Zinc Pthalocyanine, Sudan III™, Pyronin Y™, Toluylene Blue™, cresyl violet perchlorate, Mendola's Blue™, Phosphine Dye™, Nitron™, cresyl violet acetate, ceres orange R™, 4-phenylazo-1-naphtyl-amine, 4-(4-Dimethylamino-1-naptylazo)-3-methoxybenzene sulfonic acid, Bindschedler's Green™, and p-(p-dimethylaminophenylazo)benzoic acid (hereinafterwards referred to as the Group III compounds or Group III organic moieties), or (2) a binary mixture of:
(a) one or more of a Group I body of compounds (hereinafterwards referred to as the Group I compounds) consisting of (a) the organic acids, which when inserted in the solvent system at conditions other than supersaturation will yield a color change visible to the naked eye, and also have a pK of less than about four and (b) the halogenated sulfonphthaleins; and (B) one or more of a Group II body of compounds (hereinafterwards referred to as the Group II compounds) consisting of the aminotriphenylmethanes and their soluble salts, B-hydroxyquinoline, and the cyanines, with the proviso that if no Group III compound is present and if the Group II compounds must be selected from one or more of the group consisting of consist solely of one or more aminotriphenylmethanes or their soluble salts, then the Group I compound must be selected from one or more of the group consisting of oxalic acid, suitable sulfonic acids and the tetrahalogenated sulfonphthaleins, and other organic acids having a $pK_1$ of about or less than 2.

Of course, the primary application of the instant invention is where the change in state of the composition of matter is induced by temperature forces for use in a temperature-indicating device. by "suitable sulfonic acids" we mean sulfonic acids soluble in the selected solvent; these may be, for example, benzene sulfonic acid, naphthalene sulfonic acid, toluene sulfonic acid, anthracene sulfonic acid, etc., depending on the solvent.

An interesting phenomena exhibited by the compositions is illustrated by the example of a composition essentially consisting of pinacyanol iodide (at 0.035 weight percent) in ortho-bromonitrobenzene:ortho-chloronitrobenzene (75:25) solvent. In the liquid phase this composition is blue, and in the solid phase appears rose/tan. However, if the composition is chilled to a very low temperature at a very high rate of cooling initially, the color of the solid appears purple. As the composition is allowed to warm to room temperature, the color changes from purple to rose/tan, requiring about 3–5 minutes for the color to become rose/tan. (Similar phenomena have been observed with other compositions containing other Group III moieties or other Group I plus Group III combinations.

Another example of an especially preferred Group I compound is chlorophenol red at a concentration of about 0.05 percent by mass. When dissolved in a solvent such as OCNB/OBNB, dibenzofurane, para-toluic acid and other halogen nitrobenzenes, the liquid composition has a yellow color.

An enumerated above, in the absence of one or more Group III compounds to be used for the organic moieties in the solvent system, one or more of a Group I body of compounds must be employed together with one or more of a Group II body of compounds. The Group I body of compounds generally consist of (a) the organic acids, which when inserted in the solvent system (at conditions other than supersaturation) will yield a color change visible to the naked eye, and have a pK of less than about four, and (b) the halogenated sulfonphthaleins which are soluble in the selected weakly polar or monpolar aromatic solvent described below. Preferably, the Group I compound has a pK of between zero and three, and most preferably between about zero and about two. Example of this Group I body of compounds include oxalic acid, naphthalenesulfonic acid, trichloroacetic acid, bromophenol blue, bromothymol blue, chlorophenol red, bromochlorophenol blue, bromocresol green, 4,5,6-tetrabromophenol sulfonphthalein, bromophenol red, and chlorocresol green. Some compounds, such as maleic acid, will work if soluble in the predetermined solvent system employed if the correct Group II compound is chosen.

These first groups of compounds, which are generally the halogenated sulfonphthaleins, are derivatives of the sulfonphthaleins in the following ways: first the unsubstituted compounds are diprotic acid/base indicators, each having pK values of (1) a $pK_1$ of about 2 and (2) a $pK_2$ of about 7 to about 9. The halogenated derivatives show only one pK which is much lower than the $pK_2$ of the unsubstituted sulfonphthalein. Because there are halogen substituents on the sulfonphthalein molecule, it is our belief (while we do not limit the invention to the validity of our theory) that the pK value is reduced and the acid strength of the Group I is increased. As a consequence of this, the halogenated derivatives will respond in combination with one or more of the Group II compounds enumerated below to produce the color reaction. For example, in a OCNB OBNB solvent system and in combination with basic fuchsin (a Group II material), bromochlorophenol blue (a Group I material) gives a green color in the solid phase and a strikingly red color in the liquid phase. this is very similar to the color found when the bromophenol blue (a Group I compound) is combined with basic fuchsin in the same ortho chloronitrobenzene: ortho-bromonitrobenzene solvent system.

The Group II compounds, which are generally the aminotriphenylmethanes, their soluble salts, 8 hydroxyquionline, and the cyanines, act in our opinion as constituents which perform a "dye" function. Of course, as indicated by the disclosure above, a Group I compound may also act as a "dye" function. Examples of Group II compounds include thyl red, crystal violet, pararosaniline (or "para Rosaniline Base"), pararosaniline acetate (or "para Rosaniline acetate"), basic fuchsin, 8-hydroxyquinoline, ethyl violet, brilliant green, pinacyanol chloride, and 3,3-diethylthiodicarbocyanine iodide. The Group I compounds are preferably selected from the group consisting of bromophenol blue, bromochlorophenol blue, and bromothymol blue. One will notice that the second group of compounds generally consist of dyes which have basic nitrogen groups either as substituent amines or in heterocyclic rings. In general, the addition of one or more of the first group of compounds along with the second group of compounds to a solution of the previously described nonpolar or weakly polar aromatic solvent(s) such as ortho-chloronitrobenzene and ortho-bromonitrobenzene solutions will provide a color difference between the solid and liquid phases of the aromatic solvent. It is preferred that the total weight of the Group I and group II compounds be about 0.025 to about 0.05 total weight percent of the entire weight of the composition of matter. It is advised that the melting point of the Group III or Group I and Group II moieties be more than the melting point of the solvent system. It is preferred that the melting point of each of the Group I and Group II constituents be substantially more than the melting point of the solvent system selected, and it is much preferred that these Group I and Group II compounds melt at more than sixty degrees above the melting point of the solvent system. A basic requirement is that at least one of the Group I and Group II compounds reflects or absorbs light in the visible area of the spectrum at or below the melting point of the solvent system or, in the alternative, at or above the melting point of the solvent system, or both. In different colors so that a change in color is visible to the naked eye. It is also preferred that the Group I compounds weigh three or more times the wiehgt of the Group II compounds. While 0.05 weight percent of the total of the Group I and Group II compunds or Group III compound(s) is most preferred, any effective amount from the smallest for which the change in color is visible to the naked eye upon change in phases is satisfactory, and certainly no more than the solubility limits of the Group I and Group II compounds for Group III compound(s)) in the solvent system at the melting point might also be affected. A supersaturated solution of Group I and Group II compounds (or Group III compound(s)) in the solvent system, is not preferred, since Group I-III compounds are substantially more expensive than the solvent system constituents and an excess of them will be extravagant. Any pressure may be employed in making or in using the composition(s) of matter in a temperature-indicating device so long as the solvent does not generate a substantial vapor in the application for the composition. If a Group III compound is not employed, it is preferred that the Group I compound have a lesser $pK_1$ and $pK_2$ vlaue than the corresponding pK values of the Group II compound. Prefrably, the Group II compound should have a $pK_1$ value of less than about 5, and the Group I compound should have a pK1 of less than about 4.

As it will be appreciated by those skilled in the art having access to this disclosure, it is possible with the disclosure given above to combine almost any Group I compound indicated pK, which is soluble in the solvent system selected, (a solvent system of ortho-bromonitrobenzene; ortho-chloronitrobenzene, (or example) and a complementary acid base material from Group II and generate practically any desired change in color. The considerations for those skilled in the art will be (1) the selection of Group III and/or Group I and Group II compound(s) which yield a satisfactory change in predetermined colors; (2) that these compunds are soluble in the solvent system in the liquid state; (3) that the solvent system be properly determined for the temperature range desired; (4) that the Group I and/or Group II compounds (or Group III compounds) be soluble in the desired system, and (5) if pertinent, that one compound of the Group I compounds react as a strong acid against one or more of the Group II compounds in the solvent system.

As it will be recognized by those skilled in the art having access to this disclosure, one may employ combinations of more than one Group III moiety, or a combinations of more than one Group III moiety, or a combination of a Group III moiety and a Group I moiety, or a combination of a Group II moiety and Group III moiety, or more than one Group I moiety with more than one Group II moiety to obtain color shifts generally not found in a single system, e.g., a mixture of pinacyanol iodide and quinaldine red (two Group III compounds) yeilds a tan solid and deep dark purple liquid. There are some instances where two Group I compounds may be operable where one acts as an acid relative to the other e.g., (1) naphthalene sulfonic acid and one or more of (2) bromochlorophenol blue, chlorophenol blue, or bromocresol purple.

As an alternative to using one or more of the Group II compounds with one or more of the Group I compounds, one may select one of the aforesaid Group III compounds with (or preferably) in place of a combination of one or more Group I compounds and one or more Group II compounds. A caveat and proviso must be stated: in absence of a Group III compound one must employ one or more Group I compounds with one or more Group II compounds; if the Group II compounds consist solely of one or more aminotriphenylmethanes or their soluble salts, then the Group I compound must be from one or more of the group consisting of exalic acid, suitable sulfonic acids, tetrahalogenated sulfonphthaleins, and other soluble strong organic acids having a $pK_1$ of about or less than 2.

Another example of a Group I compound and a Group II compound is bromophenol blue and basic fuchsin. In the solid form, the basic fuchsin behaved as if it were at a very low pH and was in a form which has a green color between its $pK_1$ and $pK_2$. This green color of basic fuchsin at very low pH is a little known fact, but can easily be demonstrated in any laboratory with common reagents. In the liquid form, however, the bromophenol blue is yellow. The basic fuchsin was not in its first acid form and became red. Thus, the color of the liquid was red.

As will be appreciated by those in the art, generally the color of the liquid is the same or similar to the color of the Group II compound or Group III compound when dissolved in the liquid phase of most of the suitable solvents employed.

Similarly, crystal violet, which is a pH indicator having a $pK_1$ of approximately 1, forms, in combination with oxalic acid and dissolved in the OCNB/OBNB solution, a blue liquid and a yellow solid.

It has also been found as well that (1) quinaldine red (a Group III compound) which has a $pK_1$ of approximately 1.6; (2) ethyl violet, which has a $pK_1$ of about 1.2; and (3) brilliant green, which has a $pK_1$ of about 1.4, all reset in solutions with naphthalenesulfonic acid to form different colored solid- then liquid-phases.

As alternative to the above for Group I-Group II combinations, when the Group I material is other than a single acid, and is a "dye" compound (such as bromophenol blue), in addition to the Group I's behavior as an acid, there may be formed in the composition aggregates, mixed polymers, and the like, which cause what is referred t in the literature as "metachromism" or "methachromacy". "Methachromacy" is that property of a substance which is expressed as a change in color (according to the wavelength of the light in which it is viewed) due to an outside force. "Methachromacy" is mainly attributed to that color change phenomena when a dye is brought togeher with certain "tissue" molecules (macromolecules, e.g., solid materials such as hyeparin, polysaccharides). Certain organic dyestuffs, however, are characterized by different colors when dissolved in inert solvents, which is described as "solvatochromism". See HACKH'S CHEMICAL DICTIONARY 421 (4th Ed. 1969).

Once the organic moieties Group III compounds and/or Group I and Group II compounds are determined for the desired color change, they are added to a liquid mixture of the solent constituents for the predetermined temperature and mixed, preferably by any suitable industrial mechanical mixing means known to those in the art, until a substantially complete dissolution has been obtained.

After the solvent weight fractions have been determined and the composition of matter formed for each of the increment temperatures to be tested, a suitable temperture-indicating device is constructed such as the device described below having a plurality of temperature-sensitive regions, preferably having cavities in a heat-conductive carrier such as aluminum wherein each composition of matter corresponding to one of the preselected points along the temperature curve fills one of the regions, preferably a cavity. In the heat conductive carrier device. A method and apparatus for depositing precisely metered quantities of a temperature-sensitive composition of matter on a surface is taught by Pickett, et al, U.S. Pat. No. 3,810,779 (1974). Incorporated herein by reference, and the techniques of that patent are incorporated herein as much as copied verbatin. A preferable device for sealing a heat-sensitive transparent cover sheet means in vacuum-sealing engagement with an aluminum heat-conductive carrier over cavities in the carrier is the Webb Model No. 2 machine manufactured by Bio-Medical Sciences, Inc., in Fairfield, N.J. The web machine embosses the heat conducting carrier means, fills the embossed cavities with thermally responsive material utilizing the fill system disclosed in Picket et al. U.S. Pat. No. 3,810,779, and lays down a transparent cover sheet in sealing engagement with the carrier means.

2. Temperature-Indicating Device

In FIG. 1, a temperature-indicator device is disclosed comprising a flat, gradually curved, or substantially curvilinear heat-conducting carrier means having one or more spaced cavities defined herein to determine a like number of predetermined temperatures in a temperature range by means of a like number of different thermally-responsive composition of matter. Each of the predetermined temperatures is associated with a composition of matter that is substantially without impurities, and may or may not be the compositions of matter stated above, but a composition of matter which does change from an opaque form when solid to a transparent liquid upon melting. The temperature-indicating device comprises (1) a flat, gradually curved, or substantially curvilinear heat-conducting carrier with one or more cavities indented therein; (2) (in the absence of employing the compositions of matter of this invention) an indicator means located at the bottom of each of said cavities; (3) a transparent cover sheet means in sealing engagement with the carrier means above and overlying each of said cavities to form an enclosure between the walls of the cavity and the transparent cover sheet means; and (4) a composition of matter which substantially fills the cavity and is adapted to change from a solid to a liquid at substantially the predetermined temperature associated with said cavity.

Referring to FIG. 1, one will notice that colorant 1 fills the bottom of a cavity "A" in a flat heat-conducting carrier means 2 of thickness 6, which means is substantially filled with a "classical" solid solution 5. The cavity "A" is covered by a transparent cover sheet means 4 which fits in sealing engagement with heat-conducting carrier means 2 immediately surrounding cavity "A". Within solid solution 5 is a substantially spherical cavity 3 which has a diameter 10 only slightly smaller than the width 12 of the cavity minus the small width 11 of the colorant 1. In the preferred embodiment shown in FIG. 1, the carrier means cavity is in the shape of a trapezoid rotated around its axis, having a large diameter 8 at the top of the cavity and a smaller diameter 9 at the bottom of the cavity. The width 7 of the transparent film 4 is preferably substantially equal to the width 6 of the heat-conducting carrier means 2. While the exact dimensions (6,7,8,9,11,12) of a cavity in items such as those in FIG. 1 vary with the solvent system employed, the materials selected, and the composition of matter which is predetermined (whether or not one of the compositions of matter described above or a classical composition of matter which changes from opaque to transparent with change in phases from solid to liquid), it is well to describe a device employing ortho-chloronitrobenzene and ortho-bromonitrobenzene recently constructed.

Referring again to FIG. 1, the heat conducting carrier means 2 is an aluminum foil of thickness 6 of approximately 0.003 inches. The heat-conducting carrier means 2 is preferably a material which as a high thermal conductivity and relatively large surface area of contact with the test subject and be of minimum thickness, while preserving its structural integrity, in order to permit rapid conduction of heat into the cavity such as shown in FIG. 1. Where aluminum is used, its thickness may vary from about 0.001 inches to about 0.004 inches. In any event, the selection of such heat-conductive carrier means is well within the knowledge of those skilled in the art and needs no furthe relaboration. In a particularly effective embodiment, the heat-conducting carrier means may be made of plastic. The carrier is provided with the necessary strength to serve as the main structural support, while at the same time providing rapid and uniform temperature distribution throughout the thermometer device. As a consequence, the time required for taking temperature is substantially diminished. The depth 12 of cavity "A" in FIG. 1 is selected to be preferably 0.004 inches, with the upper horizontal width 9 being approximately 0.035 inches. The thickness 7 of the transparent film is approximately 0.001 inches, the letter being a painted letter on the bottom of the cavity "A". As implied in FIG. 1, a layer 1 of colorant material, e.g., paint, is stamped onto the bottom of each cavity "A" of a visible material that may be somewhat absorbed into the composition of matter or solid solution 5 upon melting of the "classical" solid solution 5 to make the colorant material more visible. The transparent film cover means 4 may be polypropylene, Mylar (polyethyleneterephthalate), nitrocellulose, polyvinyl chloride, etc. In FIG. 1, the transparent film cover means 4 is preferably a thermoplastic material and can be a coextruded film of Nylon 6® (manufactured by the Allied Chemical Company) and Surlyn 1652® (manufactured by E. I. duPont deNemours & Company) which film is produced by Pierson Industries Incorporated that is subsequently laminated to polypropylene by the Millprint Company of Milwaukee, Wis.

In each cavity "A", such as that shown in FIG. 1, one of the predetermined compositions of matter that is associated with a predetermined melting point is poured into the cavity, filling approximately 60% of said cavity. After partial filling of each cavity "A" with a particular composition of matter (here OcNB:OBNB) associated with a temperature to be measured (here between 96.0° F. and 104.8° F.), transparent film 4 is put in sealing engagement with aluminum foil 2 through the use of machine such as the Webb Model No. 2 manufactured by Bio-Medical Sciences Inc. of Fairfield, N.J. As will be recognized by those skilled in the art, small deviations could be made in ratios of the dimensions 6 through 12, or alternatively, the ratios could be maintained for different sized systems (e.g., by multiplying distances 6 through 12 by a uniform but different constant) without substantially affecting the results of the invention.

Figure 2:
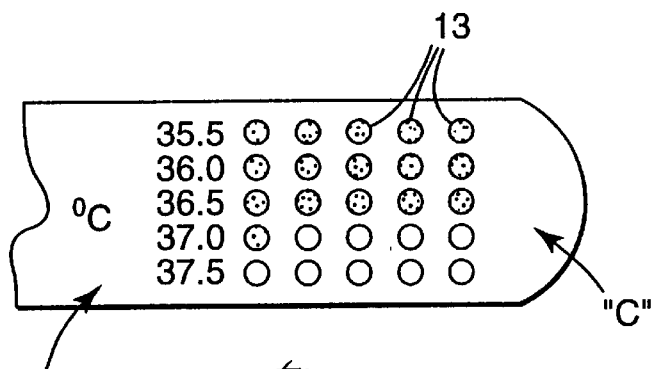
FIG. 2 is a partial plan view of a device over a part of the clinical range of temperatures embodying the principles of the prior art U.S. Pat. No. 4,232,552 in degrees Celsius.

FIG. 2 presents a partial plan view from above and the side of one embodiment of the prior art thermometer of the '552 patent showing a heat conducting carrier means, "C", of a thermometer in a Celsius scale. In a particularly effective embodiment of this clinical thermometer, a rectangular grid is formed wherein each cavity 13 employs a construction as in FIG. 1 and is clearly associated with a temperature to be determined within the range to be tested through markings located on the side of the grid.

In FIGS. 3A and 3B, another embodiment of the prior art thermometer is disclosed for measuring temperatures at 0.2° F. Increments from 96.0° F., combining the compositions of matter of the '552 patent (preferably OCNB:OBNB/pinacyanol iodide) with the cavities of FIG. 1.

FIG. 3A displays a plan view of the substantially flat oral temperature indicting device as seen from above. Again, the thermometer has an aluminum heat conducting carrier means 44 (of thickness 47 in FIG. 38) which acts not only as a main structural body of support, but at the same time provides rapid and uniform temperature distribution throughout the spatula portion "F" (having width 54 containing grid "G" of a plurality of cavities (each of diameter 57 and spaced center-to center with each neighbor along a horizontal "x" axis or vertical "y" axis in FIG. 3A at a distance 52 apart) of FIG. 1, each cavity with the composition of matter and each associated with a predetermined temperture to be measured at 0.2° F. increments from 96.0° F. to 104.8° F. "Spatula" portion "F" of the device of FIG. 3A is rounded for safety so that some distance, 56, is maintained between the most forward row of cavities and the edge of the device. It may be observed by those skilled in the art that if "classical" compositions of matter are employed in lieu of our compositions of matter, that each cavity will necessary employ an indicator layer such as layer 1 of FIG. 1. It will be evident to those skilled in the art having access to this disclosure that an indicator layer is not required when the thermally responsive material is a solvent in combination with the organic moieties of Hof et al. '552.

Again in FIG. 3A, one will not that the aluminum heat-conducting carrier means is covered above for the entire handle "E" portion of the thermometer device by a top plastic layer 42 of width 54, preferable made out of a plastic such as polystyrene, polypropylene, or polyethylene.

Also in FIG. 3A, it will be recognized that the handle "E" has been stamped from below so as to make the device realize two ridges, ribs, or abutments 41a that protrude from above the carrier means 44 by some nominal distance which is approximately the same as width 47 of carrier means 44; likewise, the device realizes two cavities 41b in carrier means 44 that parallel the ridges 41a. As will be appreciated by those skilled in the art, although the distances shown in FIGS. 3A and 3B can be readily adjusted with respect to one another or in proportion (widths 47, 48, 49, 50, 51, 52, 53, 54, 55, 56, 57, and 58 can be multiplied by different constants) it is well to described a device for measuring human temperatures in the range of 96.0° F. to 104.8° F, that we recently constructed, employing ortho-chloronitrobenzene and ortho-bromonitrobenzene in a solvent system with pinacyanol iodide in the amount of 0.035% by weight to form a thermometer with the compositions of matter of this invention, which is the best mode of our invention and which is marketed by PyMall Corporation (Somerville, N.J.) under the trandemark TEMPA DOT READY STRIP®. Referring again to FIG. 3A, the thermometer has a width 54 of about 0.345 inches at the widest portion of handle "E" and has the same width 54 of about 0.345 inches at the widest portion of handle "E" and has the same width 54 of about 0.345 inches in the spatula portion "F" of the thermometer. The cavities each have a diameter 57 of about 0.039 inches and each cavity has a depth of about 0.003 inches, and is spaced from each neighbor on a horizontal "x" axis or vertical "y" axis by a distance 52 of 0.015 inches. The top and bottom rows of cavities are of a distance 55 of about 0.039 inches from the leading edges, respectively, of the thermometer, and have a center line on the right-hand column which is adistance 56 of about 0.193 inches from the tip of the rounded edge of the spatula "G" portion of the thermometer. In FIG. 3B, taken along line 13—13 of FIG. 3A. It will be appreciated that the oral thermometer device has an overall length of 4.250 inches, and consists of an aluminum heat conducting carrier means 44 having an overall length of 4.250 inches and a depth 47 of about 0.003 inches. The aluminum head conducting carrier means 44 is covered on the handle portion "E" of the thermometer by a polypropylene or polystyrene layer of thickness 48 of about 0.003 inches; the carrier means also is in engagement with a polypropylene or polystyrene bottom plate mean 46 of width 49 of about 0.003 inches that traverses the entire length of the thermometer. Two bands of thermoplastic material (coextruded film of Xylon 6™ and Surlyn 1652™ subsequently laminated to polypropylene) cover the two sub-grids (100° F. to 104.8° F. and 96.0° F. to 99.8° F.) and are each of width 51 of approximately 0.300 inches along the "x" axis and of depth 50 of from about 0.003 to about 0.005 inches.

Figure 4:
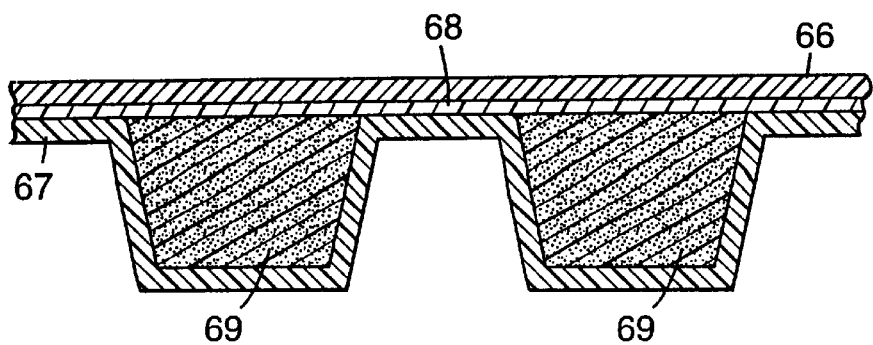
FIG. 4 is a cross-sectional view of a flat or gradually curved heat conducting carrier having a cavity defined therein, where a cover layer is bonded to a carrier layer by a pressure sensitive adhesive layer comprising polyisobutylene (PIB)

FIG. 4 depicts a cross-sectional view of the disposable thermometer of the prior art showing cavities in which are held the temperature indicating system, 69. The heat conducting material, 67, is covered by a transparent layer, 66, by a polyIsobutylene adhesive layer, 68.

The indicating system of the instant invention comprises a thermally sensitive material dispersed in a matrix forming material. The matrix forming material is an amorphous organic natural or synthetic polymeric material in which the thermally sensitive material is insoluble at the predetermined temperature at which it forms a liquid phase, and with respect to which it is inert. Any thermally sensitive material of the prior art may be utilized provided that it meets the above criteria with respect to the matrix forming material. The preferred thermally sensitive materials are the OCNB and OBNB of Hof et al '552 patent. More preferably the organic moiety of Hof et al 552 is utilized in conjunction with the OCNB and OBNB.

Illustrative non-limiting examples of matrix forming materials useful in the practice of the invention are polyisobutylene, low density polyethylene, amorphous polypropylene and microcrystalline waxes. The preferred matrix forming material is polyisobutylene. In its preferred form the matrix forming material has a number average molecular weight of about 2,500 to about 400,000; e.g., about 2,500 to about 75,000. The Parapol™ polyisobutylene typically has a viscosity of about 3,000 cm. to about 4400 cm. at 100° C. e.g., 3,500 to 4400 cm. Parapol 2500 has a typical number average molecular weight of about 2500 which corresponds to a viscosity of 4400 cm. at 100° C.

The temperature sensing composition of this invention comprises about 50 to about 75 weight percent of matrix forming material and about 25 to about 50 weight percent of a thermally responsive material. Where the thermally responsive material contains other compounds such as dyes, organic moieties of Hof '552, nucleating agents etc., the weight percent of thermally responsive material includes such other compounds. Preferably the matrix forming material comprises about 60 to about 70 weight percent of the temperature sensing composition.

In a preferred embodiment the OCNB and OBNB of Hof et al. in combination with the organic moieties disclosed therein are utilized as the thermally responsive material. As is described by Hof et al a different composition of the solid solution is utilized for each temperature to be monitored. For a clinical thermometer this will generally cover the range of 96.0° F. to about 104.8° F. The thermally responsive material of Hof et al. '552 (OCNB/OBNB) together with any other compounds is referred to as "TRM."

While a nucleating agent is not required in the practice of this invention its incorporation into the temperature sensing composition is preferred since it reduces the time for reversal of the thermometer to its unfired state to about 3–4 minutes. Where the TRM comprises the thermally responsive materials of Hof et al., the preferred nucleating agent is anthraquinone. Preferable the anthraquinone is dispersed into a quantity of matrix forming material. Components utilized in an illustrative example and the procedure for preparation are described in the example below.

EXAMPLE

A thermometer was prepared utilizing the thermally responsive solid solution of Hof et al together with pinacyanol iodide as the organic material. The following formulation was utilized.

| Component | % by weight |
|---|---|
| Polyisobutylene (Exxon Parapol 2500) | 60.0 |
| TRM | 33.3 |
| 9,10 - Anthraquinone in Parapal 2300 Premix (2.5 wt. %) | 6.7 |

The following method of preparation was utilized:
1. The polyisobutylene and TRM are heated to about 120° F.
2. The TRM is dispersed in the polyisobutylene using mechanical mixing.
3. Continue mixing while the composition is cooled to room temperature and all of the TRM has solidified and been dispersed into the polyisobutylene.
4. Add the 9,10-anthraquinone premix to the cooled blend and disperse by mechanical mixing.

The above described temperature sensitive composition is utilized in preparing a clinical thermometer. The thermometers are held in a water bath maintained at the temperature to be tested for a time sufficient to completely melt the temperature sensing composition. Reading stability of about 30 minutes is achieved at room temperature. The reading stability time and reversal time can be controlled by altering the quantity of nucleating agent utilized. Instead of using a premix, by dispersing about 1% by weight anthraquinone into the PIB/TRM dispersion, the retention time of the stable reading is reduced to 30 seconds and the time for complete reversal of the thermometer is about 10 minutes at room temperature.

In another embodiment, the TRM is ground to reduce its particle size to about 80 to about 100 mesh (U.S. Sieve Series). The TRM is the uniformly dispersed into the matrix material by mechanical mixing at a temperature below the melting pint of the TRM. The nucleating agent, or preferably the nucleating agent premix, is then added to the TRM in matrix material dispersion and mixed at a temperature below the melting point of the TRM until the nucleating agent is uniformly dispersed. The matrix forming material, e.g., polyisobutylene, cannot be a solvent for the TRM, the dye dispersed in the TRM, or for the nucleating agent. Furthermore, it must be non-volatile and not be soluble in the TRM.

It will be appreciated by those skilled in the art having access to this disclosure that any combination of TRM and matrix forming material which meet the required criteria can be used to prepared the thermometers of this invention. For taking the temperature of children, the thermometer can be used either as an axillary or rectal thermometer with appropriate adjustment of calibration to compensate for the difference in temperature indicated at such location other than the mouth as compared to body core temperature.

The term "temperature sensitive composition" as used in the specification and claims means the combination of the matrix forming material and the thermally responsive material, and optionally, an indicator such as a dye or the organic moieties of HOf et al. '552. The term "temperature responsive material" (TRM) as used in the specification and claims means a normally solid compound or mixtures of compounds which is subject ot a change of state from a solid to a liquid at a predetermined temperature within the temperature range to be monitored. The TRM must be susceptible to supercooling after it has changed from the solid to liquid state for at least a few minutes, generally several hours and as much as 24 hours.

In another embodiment of the invention the TRM is emulsified into the polyisobutylene utilizing a dispersing or emulsifying agent to assist in reducing the particle size of the TRM. Not wishing to be bound by theory, it is believed that the small particle size results in greater stability of the composition from the standpoint of setting out or coalescence of the TRM.

The preferred emulsifying agent is a $C_{14}$ to $C_{24}$ saturated alcohol; more preferably $C_{16}$ to $C_{22}$. Since the thermometers of this invention are to be used orally the dispersing or emulsifying agent of choice is cetyl alcohol because it is readily available as USP NP grade. Other grades do not present a toxicity problem. However, utilizing a USP/NF grade avoids any question as to the compounds safety.

In this embodiment of the invention the polyisobutylene (PIB) to TRM ratio, by weight, is about 90/10 to about 66/34; e.g. about 80/20 to about 75/25. The nucleating agent used in this composition is 9,10 Anthraquinone utilized at about 0.01 to about 0.10 weight percent. The saturated alcohol is utilized at about 7 ppm to about 60 ppm; e.g., about 8 ppm to about 50 ppm.

A typical formulation for preparing the improved composition of this invention is shown below.

| Component | Quantity |
|---|---|
| Parapol 2300 (PIB) | 75.15% |
| TRM | 24.75% |
| 9,10 Anthraquinone | 0.099% |
| Cetyl Alcohol | 8 ppm |

The cetyl alcohol is dissolved into the TRM prior to the emulsification step. A premix of the anthraquinone is prepared by mixing it with a minor amount of the Parapol 2500. The premix can comprise about 75 parts PIB to about 25 parts of anthraquinone to about 95 parts PIB to about 5 Parts anthraquinone. Typically, the premix composition will comprise about 80/10 to about 90/10 parts of PIB to anthraquinene; preferably about 80/10 parts of PIB to anthraquinone by weight. The emulsification step is carried out utilizing a high shear mixer. The TRM is liquefied by heating and added to the Parapol 2500 and mixed in the high shear mixer for a time sufficient to fully emulsify the two components. The blend is subsequently cooled while mixing continuously. It has been found that, generally, a mixing time of about 5 to about 10 minutes is sufficient to fully emulsify the compositions. After the emulsification step is completed the anthraquinone premix is added to the blend and mixing is continued for about 5 to about 10 minutes.

It will be appreciated by those skilled in the art having access to this disclosure that mixing times will be a function of the high shear mixer selected as well as the batch size. Mixing times are readily determined without undue experimentation. In carrying out the emulsification step a ROSS planetary mixer (a one quart model LDM) was utilized. Initially, hot water at 140° F. was run through the jacket of the mixer. As mixing continued water temperature was decreased to maintain the batch temperature at about 140° F. Subsequently, after mixing was completed, cold water was run through the jacket to cool the mixture to about 40° F. to solidify the TRM. After warming the mixture to room temperature the anthraquinone premix comprising 90 parts PIB to 10 parts of anthrequinone was added in an amount sufficient to bring the anthraquinone concentration in the TRM/PIB blend to about 0.099% by weight, and mixing continued for about 10 minutes. The batch size utilized in the Model LDM blender was about 300 grams.

After preparation of the emulsified TRM/Parapol mixture the composition is passed through a 100 mesh screen to eliminate any particles of TRM which are greater than 0.004 inches.

Surprisingly, the compositions of the reversible thermometer of this invention respond to temperature more rapidly to reach an equilibrium temperature reading as compared to the prior art thermometers of Hof '552 described above.

While the process is described as an emulsification process, it will be appreciated by those skilled in the art that the resulting product has a TRM dispersed into a matrix forming material which is insoluble in the TRM. Hence the composition of matter is substantially the same as that described above except that the particle size of the TRM has been reduced by utilizing the emulsification process.

What is claimed is:

1. A reversible thermometer composition comprising:
    solid particles of a thermally sensitive material dispersed in a matrix forming material wherein the matrix forming material is insoluble in and inert to the thermally sensitive material; and
    a nucleating agent mechanically dispersed in the matrix forming material at a temperature below the melting point of the solid particles of the thermally responsive material.

2. The composition of claim 1, wherein the composition is reversibly responsive to changes in temperature at a predetermined temperature.

3. The composition of claim 1, further comprising a means for visually observing a change in state of the thermally sensitive material from a solid to a liquid substantially at a predetermined temperature.

4. The composition of claim 3, wherein the means for visually observing comprises an indicator selected from the group consisting of a dye and an organic moiety.

5. The composition of claim 4, wherein the matrix forming material is selected from the group consisting of polyisobutylene, low density polyethylene, amorphous polypropylene, and mixtures thereof.

6. The composition of claim 5, wherein the matrix forming material is polyisobutylene.

7. The composition of claim 3, wherein the matrix forming material is selected from the group consisting of polyisobutylene, low density polyethylene, amorphous polypropylene, and mixtures thereof.

8. The composition of claim 7, wherein the matrix forming material is polyisobutylene.

9. The composition of claim 8, wherein the thermally sensitive material comprises a solid solution of o-chloronitrobenzene and o-bromonitrobenzene.

10. The composition of claim 1, wherein the nucleating agent comprises an anthraquinone.

11. The composition of claim 4, wherein the means for visually observing is an organic moiety selected from the group consisting of pinacyanol iodide, a mixture of ethyl red and bromophenol red, a mixture of ethyl red and bromocresolpurple, and a mixture of ethyl red and bromophenol blue.

12. A thermometer comprising:
    a heat conducting carrier having a multiplicity of different compositions thereon, wherein each composition comprises solid particles of a thermally sensitive material dispersed in a matrix forming material wherein the matrix forming material is insoluble in and inert to the thermally sensitive material; and
    a nucleating agent mechanically dispersed in the matrix forming material at a temperature below the melting point of the solid particles of the thermally responsive material.

13. The thermometer of claim 12, wherein each composition has a different formulation of thermally sensitive material from each other composition and wherein each composition is reversibly responsive to changes in temperature at a predetermined temperature.

14. The thermometer of claim 12, wherein the composition further comprises a means for visually observing a change in state of the thermally sensitive material from a solid to a liquid substantially at a predetermined temperature.

15. The thermometer of claim 14, wherein the means for visually observing comprises an indicator is a dye or an organic moiety selected from the group consisting of pinacyanol iodide, a mixture of ethyl red and bromophenol red, a mixture of ethyl red and bromocresolpurple, and a mixture of ethyl red and bromophenol blue.

16. The thermometer of claim 12, wherein the matrix forming material is selected from the group cinsisting of polyisobutylene, low density polyethylene, amorphous polypropylene, and mixtures thereof.

17. The thermometer of claim 16, wherein the matrix forming material is polyisobutylene.

18. The thermometer of claim 17, wherein the thermally sensitive material comprises a solid solution of o-chloronitrobenzene and o-bromonitrobenzene.

* * * * *

UNITED STATES PATENT AND TRADEMARK OFFICE
CERTIFICATE OF CORRECTION

PATENT NO. : 6,241,385 B1
DATED : June 5, 2001
INVENTOR(S) : Craig R. Hof

It is certified that error appears in the above-identified patent and that said Letters Patent is hereby corrected as shown below:

Column 1,
Line 32, delete the word "his" and insert in place thereof -- this --.

Column 2,
Line 29, delete the word "polycrylates" and insert in place thereof -- polyacrylates --.

Column 4,
Line 24, delete the word "her" and insert in place thereof -- here --.
Line 27, delete the word "bluc" and insert in place thereof -- blue --.
Line 53, "parafuchsin." should read -- parfuchsin, --.
Line 67, delete the word "Martlus" and insert in place thereof -- Martius --.

Column 9,
Line 20, "2,4-dimitro-" should read -- 2,4-dimitro- --.
Line 50, delete the word "diethylthladicarbocyanine" and insert in place thereof -- diethylthicarbocyanine --.
Line 64, "bisphenol a" should read -- bisphenol A --.

Column 10,
Lines 16 and 17, "Dicyanine A." should read -- Dicyanine A, --.
Line 17, "(p-ethoxyphenlazo)" should read -- (p-ethoxyphenylazo) --.
Line 33, delete the words "Resorcin brown™" and insert in place thereof -- Resorcin Brown™ --.
Line 41, delete the word "slue" and insert in place thereof -- Blue --.

Column 11,
Line 4, "B-hydroxyquinoline" should read -- 8-hydroxyquinoline --.
Line 42, delete the word "An" and insert in place thereof -- As --.
Line 52, delete the word "monpolar" and insert in place thereof -- nonpolar --.

UNITED STATES PATENT AND TRADEMARK OFFICE
CERTIFICATE OF CORRECTION

PATENT NO.    : 6,241,385 B1
DATED         : June 5, 2001
INVENTOR(S)   : Craig R. Hof It is certified that error appears in the above-identified patent and that said Letters Patent is hereby corrected as shown below:

Column 12,
Line 25, delete the words "thyl red" and insert in place thereof -- ethyl red --.
Line 56, "both." should read -- both, --.
Line 56, delete the word "In" and insert in place thereof -- in --.
Line 61, delete the word "compunds" and insert in place thereof -- compounds --.

Column 13,
Line 20, delete the word "or" and insert in place thereof -- for --.
Line 26, delete the word "compunds" and insert in place thereof -- compounds --.

Column 14,
Line 26, delete the word "methachromacy" and insert in place thereof
-- metachromacy --.
Line 27, delete the word "methachromacy" and insert in place thereof
-- metachromacy --.
Line 30, delete the word "methachromacy" and insert in place thereof
-- metachromacy --.
Line 31, delete the word "hyeparin" and insert in place thereof -- heparin --.
Line 53, "cavity." should read -- cavity, --.
Line 53, delete the word "In" and insert in place thereof -- in --.
Line 57, "(1974)." should read -- (1974), --.
Line 57, delete the word "Incorporated" and insert in place thereof -- incorporated --.

Column 15,
Line 35, after "A" insert the words -- and covering the solid solution 5 filling cavity "A" --.
Line 65, delete the words "further relaboration" and insert in place thereof -- further elaboration --.

Column 16,
Line 31, delete the words "$O_cNB:OBNB$" and insert in place thereof
-- OCNB:OBNB --.
Line 53, after the second instance of "F." insert the words -- to 104.8º F. --.

UNITED STATES PATENT AND TRADEMARK OFFICE
CERTIFICATE OF CORRECTION

PATENT NO. : 6,241,385 B1
DATED : June 5, 2001
INVENTOR(S) : Craig R. Hof

It is certified that error appears in the above-identified patent and that said Letters Patent is hereby corrected as shown below:

<u>Column 17,</u>
Line 50, delete the word "adistance" and insert in place thereof -- a distance --.

<u>Column 20,</u>
Line 12, delete the word "NP" and insert in place thereof -- NF --.

<u>Column 21,</u>
Line 36, delete the number "4" and insert in place thereof -- 1 --.

<u>Column 22,</u>
Line 39, delete the word "cinsisting" and insert in place thereof -- consisting --.

Signed and Sealed this

Twentieth Day of August, 2002

*Attest:*

JAMES E. ROGAN
*Attesting Officer*     *Director of the United States Patent and Trademark Office*